United States Patent
Melcher et al.

(10) Patent No.: US 10,850,666 B1
(45) Date of Patent: Dec. 1, 2020

(54) WINDOWS WITH ACTIVE LAYERS

(71) Applicant: Apple Inc., Cupertino, CA (US)

(72) Inventors: Martin Melcher, Mountain View, CA (US); James R. Wilson, Cupertino, CA (US); Khadijeh Bayat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 15/631,406

(22) Filed: Jun. 23, 2017

Related U.S. Application Data

(60) Provisional application No. 62/372,478, filed on Aug. 9, 2016.

(51) Int. Cl.
| | |
|---|---|
| *B60R 1/00* | (2006.01) |
| *G02F 1/133* | (2006.01) |
| *G02F 1/163* | (2006.01) |
| *B32B 17/10* | (2006.01) |
| *B60J 3/04* | (2006.01) |

(52) U.S. Cl.
CPC ........ *B60R 1/001* (2013.01); *B32B 17/10036* (2013.01); *B32B 17/10513* (2013.01); *B60J 3/04* (2013.01); *G02F 1/133* (2013.01); *G02F 1/163* (2013.01)

(58) Field of Classification Search
CPC .......... G02F 1/133; G02F 1/153; G02F 1/163; G02F 1/155; G02F 1/1525; G02F 1/1523; G02B 5/32; B60R 1/001; B60J 3/04; B32B 17/10036; B32B 17/10513
USPC ....... 359/361, 254, 265, 266, 270, 275, 900; 427/58, 125; 174/250
See application file for complete search history.

(56) References Cited

U.S. PATENT DOCUMENTS

| | | | | |
|---|---|---|---|---|
| 5,353,148 | A * | 10/1994 | Eid | G02F 1/155 359/265 |
| 6,535,126 | B2 * | 3/2003 | Lin | B60R 25/1004 340/545.4 |
| 6,625,875 | B2 | 9/2003 | Sol | |
| 6,795,226 | B2 * | 9/2004 | Agrawal | B32B 17/10036 359/265 |
| 2003/0127452 | A1 | 7/2003 | Gerhardinger et al. | |
| 2010/0270280 | A1 | 10/2010 | Blanchard et al. | |
| 2012/0019889 | A1 * | 1/2012 | Lamine | G02F 1/155 359/266 |
| 2012/0200908 | A1 * | 8/2012 | Bergh | G02F 1/1523 359/275 |
| 2013/0092676 | A1 | 4/2013 | Offermann et al. | |

* cited by examiner

*Primary Examiner* — Jie Lei
(74) *Attorney, Agent, or Firm* — Treyz Law Group, P.C.; G. Victor Treyz; Kendall W. Abbasi

(57) ABSTRACT

A system such as a vehicle may have windows. A window may be provided with a light modular or other active layer having an electrically adjustable optical property. The active layer may have a pair of electrodes. The electrodes may be used to apply electric fields across the active layer to adjust the active layer. A lower sheet resistance electrode may be supplied with a current to ohmically heat the active layer. A higher sheet resistance electrode may be supplied with a voltage gradient to create a gradient in light transmission or other optical property as a function of distance across the higher sheet resistance electrode. The electrodes may be provided with terminals that are formed from elongated strips of metal or other terminal structures. The terminals may run along the peripheral edges of the electrodes.

20 Claims, 6 Drawing Sheets

|  |  | T1A | T1B | T2A | T2B |
|---|---|---|---|---|---|
| R1 | HOMOGENEOUS STATE 1 | VG | VG | VG | VG |
| R2 | HOMOGENEOUS STATE 2 | VG | VG | V | V |
| R3 | GRADIENT STATE | VG | VG | VG | V |
| R4 | HEATING STATE 1 | VG | VP | VG | VP |
| R5 | HEATING STATE 2 | VG | VP | V | VP+V |

*FIG. 6*

WINDOWS WITH ACTIVE LAYERS

This application claims the benefit of provisional patent application No. 62/372,478, filed Aug. 9, 2016, which is hereby incorporated by reference herein in its entirety.

FIELD

This relates generally to systems with windows, and, more particularly, to systems such as vehicles having windows with electrically adjustable layers.

BACKGROUND

Vehicle windows sometimes include heating and light filtering components. For example, vehicle windows may include filter layers that block infrared light. Vehicle windows with infrared-light-blocking capabilities may help avoid excessive heat buildup in vehicles that are exposed to sunlight. A rear window in a vehicle may use an ohmically heated wire for defrosting. A vehicle may have a sunroof window with an adjustable tint for selectively darkening or brightening of the interior of the vehicle.

It can be challenging to incorporate systems such as these effectively into a vehicle. If care is not taken, window structures may be unsightly, may be insufficiently flexible, and/or may not exhibit adequate performance.

SUMMARY

A system such as a vehicle may have windows. The windows may be provided with active layers. The active layers may have electrically adjustable optical properties such as light transmission, reflectivity, and haze.

A window may have an outer structural layer that is laminated to an inner structural layer using a layer of polymer. An active layer and additional structures may be embedded in the polymer layer or may otherwise be placed between the outer and inner structural layers. The additional structures may include dielectric thin films, conductive layers such as thin-film metal layers, layers that form filters for blocking infrared, visible and/or ultraviolet light, layers for diffusing light and other structures.

Electrodes associated with an active layer may be used to apply electric fields across the active layer to adjust an optical property of the active layer. A lower sheet resistance electrode may be supplied with a current to ohmically heat the active layer. A higher sheet resistance electrode may be supplied with a voltage gradient to create a gradient in light transmission or other optical property as a function of distance across the higher sheet resistance electrode.

The electrodes may be provided with terminals that are formed from elongated strips of metal or other terminal structures. The terminals may run along the peripheral edges of the electrodes.

BRIEF DESCRIPTION OF THE DRAWINGS

FIG. 6 is a table showing how an active layer in a window may be operated in a variety of configurations in accordance with an embodiment.

DETAILED DESCRIPTION

A system may have windows with one or more structural layers such as layers of glass or rigid plastic. For example, a window may have an outer structural layer such as an outer glass or plastic layer that is laminated to an inner structural layer such as an inner layer of glass or plastic using a layer of polymer. To provide the windows with desired optical properties, additional structures may be incorporated into the windows. These additional structures may include dielectric thin films, conductive layers such as thin-film metal layers, layers that form filters for blocking infrared, visible and/or ultraviolet light, layers for diffusing light and/or other structures. The additional structures may include electrically adjustable layers. These layers, which may sometimes be referred to as active layers may include light modulators and adjustable haze layers. The active layers may have electrodes. The electrodes may be used to apply electric fields across the active layers to adjust the optical properties of the active layers (transparency, reflectivity, haze, etc.). The electrodes may also be supplied with current to ohmically heat a widow. A window may be heated, for example, when it is desired to defrost the window or to speed up chemical processes that might otherwise be slowed by cold temperatures (e.g., in an electrochromic light modulator)

The electrodes may be provided with terminals (sometimes referred to as busbars) formed from elongated strips of metal or other highly conductive terminal structures that run along the edges of the electrodes. Using these terminals, control voltages may be applied to the edges of the electrodes that result in electric field strengths through the thickness of the active layer that vary as a function of lateral position across the surface of the active layer (e.g., across the surface of a window). Use of terminals to create electric field gradients in this way may allow active layers to produce optical effects such as gradients in tint, haze, and/or reflectivity across the surface of a window.

Figure 1:
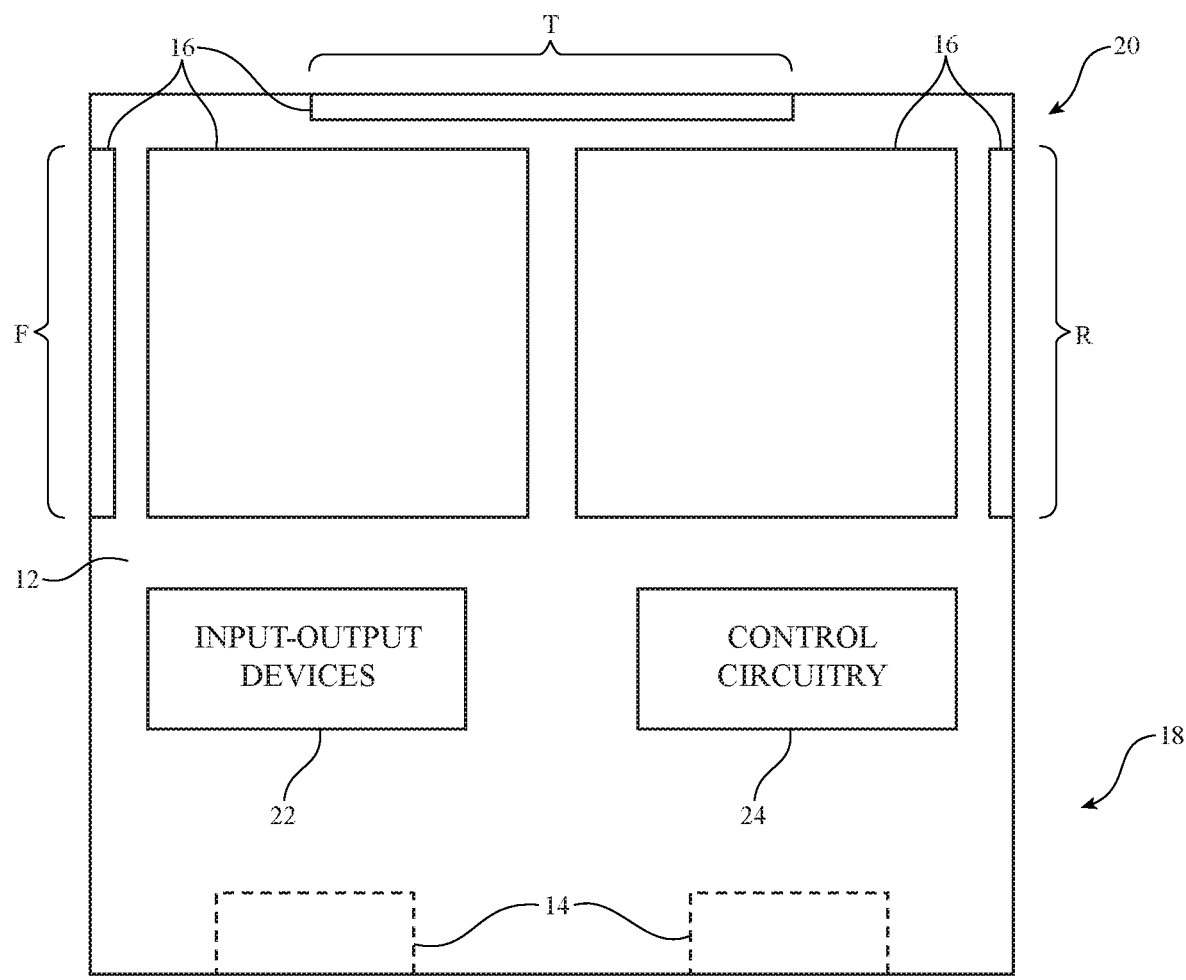
FIG. 1 is a schematic diagram of an illustrative system in accordance with an embodiment.

An illustrative system with windows is shown in FIG. 1. As shown in FIG. 1, system 10 may be a vehicle having portions such as portions 18 and 20. Portion 18 may include wheels 14, a body such as body 12 with a chassis to which wheels 14 are mounted, propulsion and steering systems, and other vehicle systems. Body 12 may include doors, trunk structures, a hood, side body panels, a roof, and/or other body structures. Seats may be formed in the interior of vehicle 10. Portion 20 may include windows such as window(s) 16 mounted to body 12. Window 16 and portions of body 12 may separate the interior of vehicle 10 from the exterior environment that is surrounding vehicle 10.

Windows 16 may include front windows on front F of vehicle 10, a moon roof (sunroof) window or other window extending over some or all of top T of vehicle 10, rear windows on rear R of vehicle 10, and side windows on the sides of vehicle 10 between front F and rear R. Windows 16 may be formed from one or more layers of transparent glass, clear rigid polymer (e.g., polycarbonate), polymer adhesive layers, and/or other layers. In some arrangements, window(s) 16 may include laminated window structures such as one or more transparent layers (glass, rigid polymer, etc.) with interposed polymer layer(s). The polymer in a laminated window may be, for example, a polymer such as polyvinyl butyral (PVB) or ethylene-vinyl acetate (EVA).

Conductive layers and other layers of material (e.g., adjustable layers) may be incorporated in windows 16 with transparent structural layers of glass or plastic. With one suitable arrangement, windows 16 are vehicle windows and include one or more glass layers with optional laminating polymer into which an active layer is embedded. This type of arrangement may sometimes be described herein as an example. If desired, other types of window structures may be used and these window structures may be used in buildings or other systems in addition to vehicles.

Vehicle 10 may include control circuitry 24 and input-output devices 22. Control circuitry 24 may include storage and processing circuitry for supporting the operation of vehicle 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Control circuitry 24 may also include processing circuitry based on one or more microprocessors, microcontrollers, digital signal processors, baseband processors, power management units, audio chips, application specific integrated circuits, etc.

Processing circuitry in control circuitry 24 may be used to control the operation of vehicle 10 and the components in vehicle 10 (e.g., components associated with windows 16 and input-output components 22, etc.). For example, control circuitry 24 can apply signals to terminals associated with electrodes in the active layer of a window. These signals can be used to ohmically heat a window and/or may be used to control the optical properties (transmission, reflection, haze, etc.) of the active layer. If desired, conductive layers in window 16 (e.g., electrode layers in an active layer, etc.) may be divided into multiple areas (e.g., so that the left and right halves of a window or other window regions can be controlled independently).

Input-output devices 22 may be used to gather data for vehicle 10, may be used to gather information from a user (vehicle occupant, etc.) of vehicle 10, may be used to provide data from vehicle 10 to external systems or a user, and/or may be used in handling other input and output operations. Input-output devices 22 may include buttons, scrolling wheels, touch pads, key pads, keyboards, and other user input devices. Microphones may be used to gather voice input from a user and may gather information on ambient sounds. Devices 22 may include ambient light sensors, proximity sensors, magnetic sensors, force sensors, accelerometers, image sensors, and/or other sensors for gathering input. Output may be supplied by devices 22 using audio speakers, tone generators, vibrators, haptic devices, displays, light-emitting diodes and other light sources, and other output components. Vehicle 10 (e.g., devices 22, etc.) may include wired and wireless communications circuitry that allows vehicle 10 (e.g., control circuitry 24) to communicate with external equipment and that allows signals to be conveyed between components (circuitry) at different locations in vehicle 10.

Figure 2:
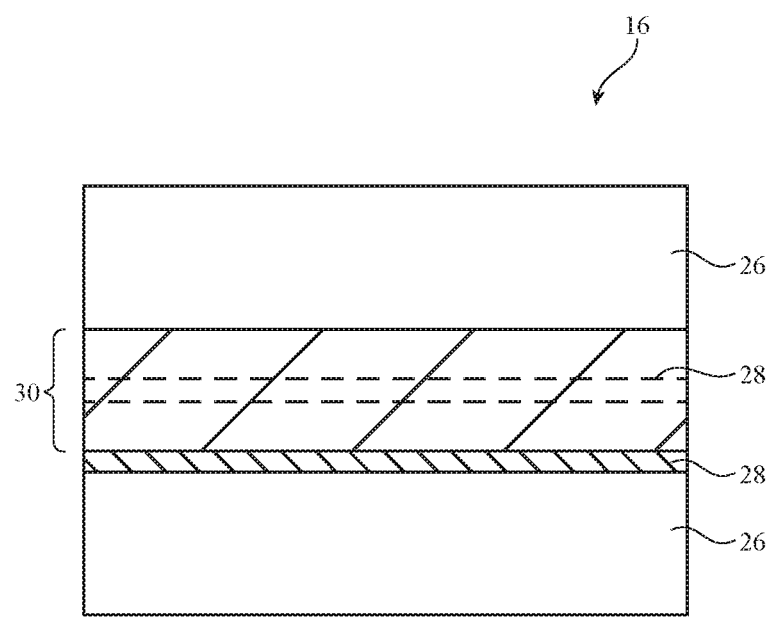
FIG. 2 is a cross-sectional side view of an illustrative window in accordance with an embodiment.

A cross-sectional side view of an illustrative window is shown in FIG. 2. As shown in FIG. 2, window 16 may include one or more transparent structural layers such as structural window layers 26. Two layers 26 are included in window 16 in the example of FIG. 2, but more than two layers or fewer than two layers may be included in window 16, if desired. Layers 26 may be clear layers of rigid polymer, glass, or other transparent material. Polymer layer 30 (e.g., a PVB layer, an EVA layer, or other polymer layer) may be used to couple layers 26 together. One or more layers such as layer 28 may be included in window 16. These layers may include diffuser layers (e.g., a translucent sheet of polymer, a textured polymer layer coated with a thin transparent metal layer, etc.), a light filter (e.g., a silver layer or other metal layer or a filter formed from a multilayer dielectric stack having layers with different refractive index values or other multilayer filter structure that is used to block infrared light, ultraviolet light, and/or visible light), a tint layer (e.g., an optical absorption layer that has a gray color or other suitable color), and/or may include one or more active layers.

For example, layer 28 may be an active layer such as a light modulator layer, an adjustable reflector (which also serve as a light modulator layer), and/or an adjustable haze layer. These active layers may include electrodes. The electrodes may be formed from thin metal, a transparent conductive material such as indium tin oxide, and/or other conductive layers. If desired, one or more of the electrodes may serve as an infrared blocking layer and/or visible light blocking layer in addition to serving as an electrode for layer 28. One or more of the electrodes of layer 28 or other thin-film layers in window 16 may, for example, be formed from a thin-film layer of silver or other metal. The thin-film layer may block infrared light (e.g., infrared light transmission may be less than 90%, less than 50%, less than 10%, more than 1%, or other suitable value) and may reduce visible light transmission (e.g., light transmission may be less than 95%, less than 85%, more than 30%, or other suitable value). In general, an electrode (e.g., a lower sheet resistance electrode) may have thin-film coatings and/or thin-films on substrate films such as thin-film metal coatings (e.g., silver, gold, copper, and/or other metals) and/or dielectric layers, and/or transparent conductive oxides (e.g., indium tin oxide, zinc oxide, etc.).

Light modulator layers for window 16 may include liquid crystal light modulators, electrochromic devices, and suspended particle devices (as examples).

A liquid crystal light modulator layer may have a pair of electrodes located between a pair of polarizers. The electrodes may apply electric fields to a layer of liquid crystal material between the electrodes. Liquid crystal light modulator layers may also be based on guest-host systems. A guest-host liquid crystal device may include a light-absorbing dye "guest" in a liquid crystal "host" layer. These materials may form a layer that is sandwiched between a pair of electrodes. When an electric field is applied to the guest-host layer by the electrodes, the liquid crystals rotate, thereby rotating the guest dye into an orientation that enhances light absorption. When the electric field is removed, the guest dye molecules are no longer held in the high-absorption orientation so that the guest-host layer becomes transparent.

An electrochromic light modulator may have an electrolyte such as LiNiOP (e.g., a gel electrolyte) that is interposed between electrochromic coatings on a pair of electrodes. The electrochromic coatings may be, for example, a $Li_xNiO$ coating on a first of the electrodes and a $WO_3$ coating on a second of the electrodes. The electrodes may be used to apply a current to the electrochromic coatings to either darken (color) or lighten (discolor) the electrochromic light modulator.

A suspended particle light modulator layer may contain a layer of nanoparticles suspended in a liquid that is sandwiched between substrate layers with transparent electrodes. In the absence of an applied electric field, the nanoparticles are randomly oriented and absorb light (i.e., the tint of the suspended particle light modulator layer will be dark). When an electric field is applied, the nanoparticles align and allow light to pass (i.e., the tint of the suspended particle light modulator layer will be clear). In addition to allowing an adjustable tint to be obtained, suspended particle devices are characterized by an associated adjustable haze (e.g., a 6% haze when the suspended particle device is off and is exhibiting a low amount of light absorption and a 50% haze when the suspended particle device is on and is exhibiting a high amount of light absorption). In this way, a suspected particle device may serve both as a light modulator layer and as an adjustable haze layer.

If desired, layer 28 may be an adjustable haze layer such as a polymer-dispersed liquid crystal device. In this type of device, a polymer layer having voids filled with liquid crystal material may be sandwiched between conductive transparent electrodes on respective first and second transparent substrates. When no electric field is applied to the electrodes, the liquid crystals in the voids are randomly oriented and exhibit an index-of-refraction difference with the surrounding polymer layer. This causes the liquid crystal material of the voids to produce a relatively large amount of haze that scatters light that is passing through the adjustable haze layer. When an electric field is applied to the electrodes by control circuitry 24, the liquid crystals of the liquid crystal material in the voids becomes aligned so that the liquid crystal material in the voids exhibits an index of refraction that matches the surrounding polymer. In this configuration, the polymer-dispersed liquid crystal exhibits low haze and high transparency. Intermediate haze levels may be achieved by applying an electric field at an intermediate level.

Layer 28 may be an adjustable layer that exhibits adjustable reflectivity (and therefore adjustable light transmission). For example, layer 28 may be a cholesteric liquid crystal layer that exhibits an adjustable mirror reflectivity. When used in layer 28, the cholesteric liquid crystal device may be characterized by an "on" state and an "off" state. In the "on" state (e.g., when control circuitry 24 applies a voltage across layer 28 using a pair of electrodes), the cholesteric liquid crystal device may be transparent. The transmission of the cholesteric liquid crystal device may be adjusted by adjusting the applied voltage (i.e., layer 28 may serve as both an adjustable reflectivity layer and as a light modulator layer). In the "off" state, the cholesteric liquid crystal device may act as a partial mirror and may reflect more than 50% of incident light, more than 70% of incident light, less than 99% of incident light, or other suitable amount of incident light.

Cholesteric liquid crystal layers may exhibit relatively fast switching speeds, low haze (e.g., haze values of less than 5%), and good reflectivity (e.g., when "off"). If desired, adjustable reflectivity layers may be implemented using other types of adjustable mirror components. For example, an adjustable reflectivity component for layer 28 may be formed from a solid-state switching mirror component based on a switchable metal hydride film (e.g., layer 28 may be an adjustable magnesium hydride mirror).

If desired, other adjustable layers may be used as active layer devices in window 16 (e.g., organic light-emitting diode display layers, light modulators with pixels, liquid crystal display devices, etc.). Moreover, two or more of these devices may be incorporated into window 16 (e.g., to form a device with adjustable haze, adjustable reflectivity, and/or adjustable light transmission). Active layers may be laminated together using interposed layers of adhesive (e.g., PVB, EVA, etc.) and/or may be formed as thin-film stacks (e.g., by depositing substrate layers, metal coating layers, transparent electrode coatings, dielectric coatings, liquid layers, and/or other layers in a stack on one or more structural window layers such as window layers 26). As illustrated in FIG. 2, for example, layers 28 may be formed on substrates 26 (e.g., as coatings, laminated films, etc.) and/or may be embedded within layer 30 (e.g., when an active layer is formed on one or more substrate layers such as polymer films, glass or polymer sheets, etc.).

Figure 3:
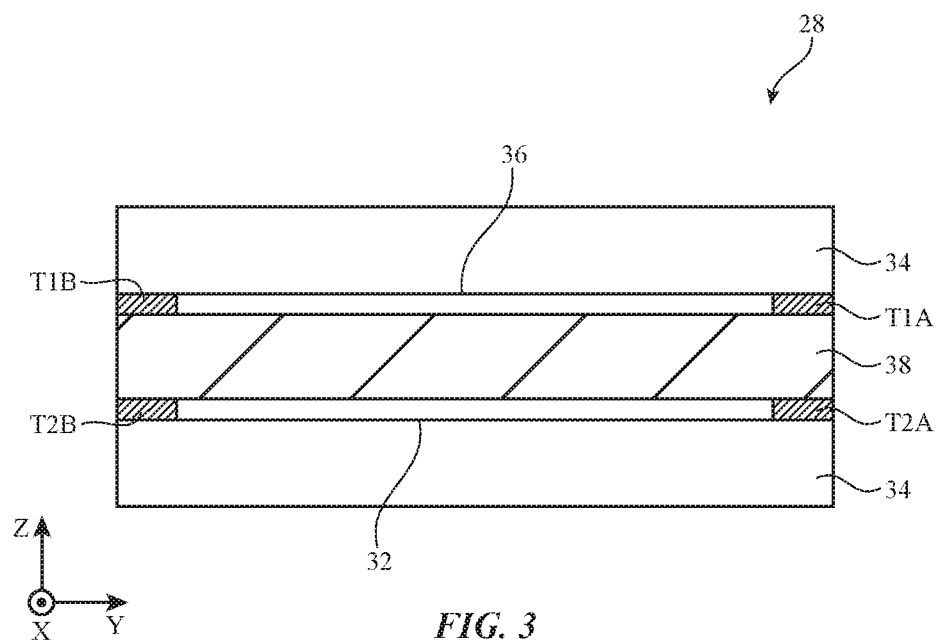
FIG. 3 is cross-sectional side view of an illustrative active layer with terminals for a window in accordance with an embodiment.

A cross-sectional side view of an illustrative active layer for window 16 is shown in FIG. 3. As shown in FIG. 3, active layer 28 may include electrodes such as electrode 36 and electrode 32. Electrodes 32 and 36 may be parallel to the XY plane of FIG. 3. Layer 28 may have a thickness in dimension Z that is associated with active layer material 38. Active layer material 38 (e.g., a layer of liquid crystals, polymer dispersed liquid crystals, suspended particle device material, electrolyte, etc.) may be sandwiched between electrodes 36 and 32. Electrode 36 may be an outer electrode and may face an exterior region that surrounds vehicle 10 and electrode 32 may be an inner electrode facing the interior of vehicle 10 or electrode 32 may be an outer electrode and 36 may be an inner electrode.

Electrodes 36 and 32 may be supported by layers such as layers 34. Layers 34 may be substrate layers that are embedded in polymer 30 (e.g., layers 34 may be flexible sheets of polymer, thin glass layers, or other substrate layers that support electrodes 36 and 32 and that surround layer 38) or one or both of layers 34 may be structural window layers such as layers 26 of FIG. 2.

Each electrode in active layer 28 may have one or more electrode terminals. In the example of FIG. 3, electrode (electrode layer) 36 has first terminal T1A and second terminal T1B. Electrode (electrode layer) 32 has first terminal T2A and second terminal T2B. Terminals T1A, T1B, T2A, and T2B may be elongated conductive structures (sometimes referred to as busbars) that run along the edges of electrodes 36 and 32 and that extend into the page of FIG. 3 along dimension X or may have other suitable shapes. Terminals T1A, T1B, T2A, and T2B may be formed from thin-film metal structures or other conductive layers that have a lower sheet resistance than the materials of electrodes 36 and 32 and may be formed above and/or below electrodes 36 and 32.

By providing active layer 28 with multiple terminals, signals may be applied across the thickness of active layer 28 (e.g., to apply an electric field for adjusting the optical properties of layer 28 such as light transmission, reflectivity, haze, etc.) and may be applied laterally (parallel to the surface of layer 28) to create an ohmic heating current that raises the temperature of active layer 28 and window 16.

Figure 4:
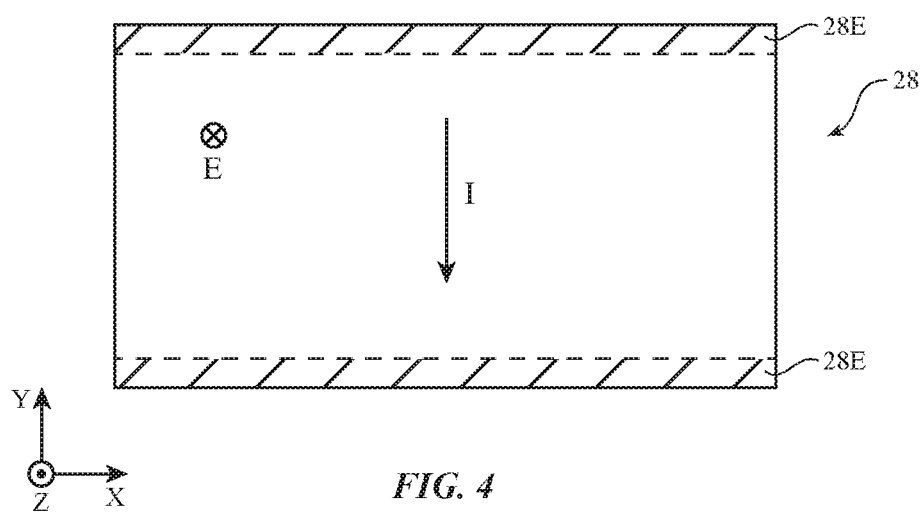
FIG. 4 is a diagram of an illustrative active layer with upper edge and lower edge terminals in accordance with an embodiment.

Consider, as an example, illustrative active layer 28 of FIG. 4. Active layer 28 of FIG. 4 has lateral dimensions in the XY plane and a thickness along axis Z. Light propagating along axis Z may pass through active layer 28 (which may be embedded in window 16 of FIG. 2). Electrodes may extend parallel to the XY plane across the front and rear surfaces of layer 28. Active layer material may be sandwiched between these electrodes. Terminals 28E may be coupled to the front and rear electrodes. When it is desired to modulate the light transmission, reflection, haze, or other optical characteristics of active layer 28, the terminals of layer 28 may be used to apply electric fields E to layer 28 parallel to the Z axis (across the thickness of layer 28). When it is desired to ohmically heat layer 28, a voltage may be supplied between the top edge and bottom edge electrodes 28E, thereby giving rise to an ohmic heating current I that flows laterally through layer 28 (i.e., in the XY plane).

The sheet resistance of each of the electrodes of layer 28 may be the same or may be different. For example, an electrode that is to be used as an ohmic heating layer may have a relatively low sheet resistance so that ohmic heating current flow is not impeded. The sheet resistance of an electrode that can receive a current for ohmic heating may be, for example, 0.5 to 5 ohm/square, more than 0.1 ohm/square, or less than 10 ohm/square. The sheet resistance of the other electrode in active layer 28 may also be relatively low (e.g., so that ohmic heating currents can be applied through both electrodes) or may be higher. In scenarios in which electrode sheet resistance is relatively high (e.g., higher than the lower-resistance electrode such as more than 10 ohm/square, more than 100 ohm, square, more than 1000 ohm/square, less than 5000 ohm/square, etc.), electric field gradients may be established. For example, a gradient in electric field E across the thickness of layer 28 of FIG. 4 may be established by applying different voltages to the upper edge and lower edge terminals 28E of FIG. 4 on the front electrode which applying a common voltage to the terminals on the rear electrode. When signals such as these are applied to layer 28, the electric field E will vary as a function of lateral position (e.g., as a function of position in lateral dimension Y in the example of FIG. 4).

Electric field gradients may cause layer 28 to exhibit optical properties that depend on lateral position within layer 28. For example, in a light modulator, a gradient in electric field E across the surface of layer 28 will produce a light transmission value that varies as a function of lateral position. In an adjustable reflectivity layer, a reflectivity gradient may be established. Electric field gradients in active layers with adjustable haze properties may establish haze values that vary as a function of lateral position in layer 28. Gradients may be static or may be moving (e.g., to produce a tinted window region or adjustable haze region that moves up or down a side window). If desired, one electrode (e.g., a lower sheet resistance electrode) may be used for ohmic heating while another electrode (e.g., a higher sheet resistance electrode) may be used for establishing a voltage that drops as a function of lateral position (e.g., position Y in the FIG. 4 example) and that therefore establishes a gradient in electric field E.

Figure 5:
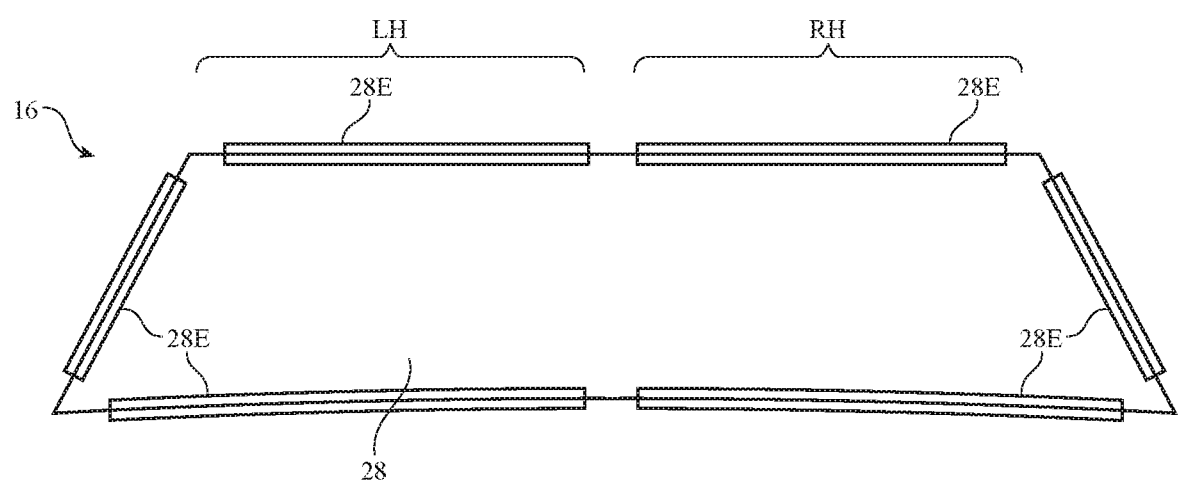
FIG. 5 is a diagram of an illustrative window with terminals at a variety of locations around its periphery in accordance with an embodiment.

Active layer terminals may be located on any suitable portions of the active layer electrodes. As an example, active layer terminals 28E may be located along the upper, lower, and side edges of layer 28 in window 16 of FIG. 5. Terminals 28E may be segmented to allow individual control (e.g., to allow various patterns of ohmic heating currents to be established, to allow light transmission, light reflection, and/or haze gradients to be established in various patterns, etc.). Terminals 28E may be located along the periphery of layer 28 and window 16 and may allow haze, light transmission, light reflection, other optical properties, and/or ohmic heating patterns to be adjusted independently for the left side LH and right side RH of window 16 (as an example). There may, in general, be any suitable number of terminals associated with electrode 32 (e.g., one, two or more, three or more, four or more, two to four, fewer than ten, etc.) and any suitable number of terminals associated with electrode 36 (e.g., one, two or more, three or more, four or more, two to four, fewer than ten, etc.).

FIG. 6 is a table of terminal voltages that may be applied to terminals such a terminals T1A, T1B, T2A, and T2B in an active layer such as active layer 28 of FIG. 3 in various illustrative operating scenarios, assuming that electrode 36 has a lower sheet resistance (e.g., a sheet resistance that makes electrode 36 suitable for ohmic heating operations) and assuming that electrode 32 has a higher sheet resistance than the sheet resistance of electrode 36 (e.g., so that voltage drops can be established across electrode 32 to create gradient optical effects). The illustrative voltages applied to the terminals of layer 28 in these examples include a ground voltage VG (e.g., 0 volts or other suitable voltage level), a positive power supply voltage level VP (e.g., a voltage between 12V and 48V, lower voltages such as a few volts for electrochromic light modulator active layers, higher voltages such as 100 V or more for suspended particle devices, or other suitable positive power supply voltage), and an adjustable operating voltage V (e.g., a voltage whose magnitude is adjusted to control the degree to which layer 28 modulates light transmission, light reflection, haze, or other adjustable optical parameters). These voltages may be direct-current (DC) voltages and/or alternating-current (AC) voltages.

In the scenario of row R1, control circuitry 24 supplies all terminals T1A, T1B, T2A, and T2B with voltage VG, so no voltage gradients are established across the electrodes of layer 28, electric field E is zero throughout layer 28 and layer 28 has a first homogeneous state. As an example, layer 28 may have a light transmission state characterized by a constant transmission, reflection, and haze for all lateral positions X, Y on layer 28.

In the scenario of row R2, control circuitry 24 supplies terminals T1A and T1B on electrode 36 with the same voltage (VG) and supplies terminals T2A and T2B on electrode 32 with the same voltage (V). In this scenario, there is no voltage change between the two opposing edges of electrode 36 and there is no voltage change between the two opposing edges of electrode 32, so there are no changes (gradients) in electric field E as a function of lateral position X, Y and the optical properties of layer 28 are homogeneous across the surface of layer 28. There is, however, a non-zero electric field E established across the thickness of layer 28 (i.e., across material 38) in the row R2 scenario, whereas the electric field E in the row R1 scenario was zero. As a result, the state of layer 28 changes between the row R1 state and the row R2 state (e.g., by changing homogenously from dark to light, from light to dark, from hazy to clear, from reflective to non-reflective, or by adjusting any one or more of these parameters incrementally).

In the row R3 scenario, a gradient in electric field E is established by setting terminals T1A and T1B to VG while establishing a voltage drop in electrode 32 that varies as a function of dimension Y by setting terminal T2A to VG and terminal T2B to a desired value of operating voltage V. The magnitude of the gradient in electric field E can be adjusted by adjusting the magnitude of voltage V. No significant lateral current flows through electrodes 32 and 36 in the row R1, R2, and R3 scenarios, because the voltage across electrode 36 is zero in each of these scenarios.

In the scenario of row R4, however, different voltages VG and VP are applied respectively to terminals T1A and T1B of the low sheet resistance electrode 36. This creates an ohmic heating current I through terminals T1A and T1B and through electrode 36 that ohmically heats layer 28. The same voltages VG and VP are applied respectively to electrodes T2A and T2B, so the electric field strength is zero across the thickness of layer 28 (in dimension Z) and there is no gradient in electric field E as a function of lateral position. As a result, layer 28 will exhibit the same optical properties as in the scenario of row R1 (e.g., the same light transmission state).

In the scenario of row R5, terminal T1A is held at VG and terminal T1B is held at voltage VP, so there is a voltage drop VP-VG across electrode 36 and ohmic heating current flows through electrode 36. The voltages at terminals T2A and T2B in this scenario are respectively V and VP+V. The voltage and therefore the electric field E across the thickness of layer 28 in this scenario is homogeneous (invariant in X and Y) and is proportional to operating voltage V. The magnitude of voltage V may therefore be adjusted by control circuitry 24 to adjust the optical characteristics of layer 28 as desired (e.g., to select a desired light transmission state, to select a desired reflectivity, and/or to select a desired haze).

Other operating scenarios are possible (e.g., to create gradient effects with heating, etc.). The illustrative operating configurations of the table of FIG. 6 are merely illustrative.

The foregoing is merely illustrative and various modifications can be made to the described embodiments. The foregoing embodiments may be implemented individually or in any combination.

What is claimed is:

1. A vehicle, comprising:
a vehicle body;
control circuitry; and
a vehicle window in the body, wherein the vehicle window has a layer with an electrically adjustable optical property, first and second opposing surfaces with respective first and second electrodes, a thickness, first and second terminals coupled to edges of the first electrode, and third and fourth terminals coupled to edges of the second electrode, wherein the control circuitry is configured to supply signals to the first, second, third, and fourth terminals, wherein the second electrode spans a distance between the third and fourth terminals, and wherein the layer is operable in a homogenous state in which the adjustable optical property is constant laterally across the layer and a gradient state in which the adjustable optical property varies laterally across the layer.

2. The vehicle defined in claim 1 wherein the control circuitry is configured to apply current to the first electrode through the first and second terminals to ohmically heat the layer.

3. The vehicle defined in claim 2 wherein the control circuitry is configured to provide different respective voltages to the third and fourth terminals to supply an electric field across the thickness that varies as a function of distance between the third and fourth terminals and that adjusts the electrically adjustable optical property.

4. The vehicle defined in claim 3 wherein the layer comprises a light modulator layer and wherein the electrically adjustable optical property is light transmittance through the layer.

5. The vehicle defined in claim 3 wherein the layer comprises an adjustable reflectively layer and wherein the electrically adjustable optical property is light reflectivity.

6. The vehicle defined in claim 3 wherein the layer is a polymer-dispersed liquid crystal layer and wherein the adjustable optical property comprises haze.

7. The vehicle defined in claim 3 wherein the layer comprises an electrochromic light modulator layer and wherein the adjustable optical property is light transmittance through the electrochromic light modulator layer.

8. A vehicle, comprising:
a vehicle body;
a vehicle window in the vehicle body comprising:
at least one transparent layer; and
a light modulator layer coupled to the transparent layer that has first and second electrode layers with first and second respective sheet resistances, wherein the first sheet resistance is less than the second sheet resistance, the light modulator layer further having a layer of material between the first and second electrode layers, first and second terminals coupled to edges of the first electrode layer, and third and fourth terminals coupled to edges of the second electrode layer, and wherein the second electrode layer spans a distance between the third and fourth terminals; and
control circuitry configured to:
ohmically heat the first electrode layer by supplying current that flows between the first and second terminals through the first electrode layer while applying a first set of voltages to the third and fourth terminals to place the light modulator layer in a homogenous light transmission state in which light transmission is constant laterally across the light modulator layer; and
ohmically heat the first electrode layer by supplying current that flows between the first and second terminals through the first electrode layer while applying a second set of voltages to the third and fourth terminals to place the light modulator layer in a gradient light transmission state in which light transmission varies laterally across the light modulator layer.

9. The vehicle defined in claim 8 wherein the light modulator layer comprises a liquid crystal light modulator with polarizers.

10. The vehicle defined in claim 8 wherein the light modular layer comprises a guest-host liquid crystal layer.

11. The vehicle defined in claim 8 wherein the light modulator layer comprises a suspended particle device.

12. The vehicle defined in claim 8 wherein the light modulator layer comprises an electrochromic light modulator.

13. The vehicle defined in claim 8 wherein the transparent layer is an outer vehicle window layer and wherein the apparatus further comprises:
an inner vehicle window layer; and
a polymer layer coupled between the outer vehicle window layer and the inner vehicle window layer, wherein the light modulator layer is between the outer and inner window layers.

14. The vehicle defined in claim 8 wherein the transparent layer comprises a glass vehicle window layer and wherein the control circuitry is further configured to operate in a state in which the control circuitry prevents current from flowing between the first and second terminals.

15. The vehicle defined in claim 8 wherein the first electrode layer comprises a metal layer.

16. The vehicle defined in claim 8 wherein the transparent layer comprises an outer window layer, the apparatus further comprising an inner window layer, wherein the light modulator layer is between the outer window layer and the inner window layer, the first electrode is an infrared light blocking layer that reduces transmission of light through the transparent layer, the second electrode is a transparent metal oxide layer, and the active material comprises liquid crystal material.

17. A vehicle, comprising:
a vehicle body;
a vehicle window in the vehicle body, comprising:
   transparent layers; and
   an active layer between the transparent layers, wherein the active layer has at least first and second electrode layers, first and second terminals coupled to edges of the first electrode layer, and third and fourth terminals coupled to edges of the second electrode layer, wherein the first and second electrode layers have respective first and second sheet resistances, wherein the first sheet resistance is less than the second sheet resistance, wherein the second electrode layer spans a distance between the third and fourth terminals, and wherein the active layer is operable in a homogenous state in which an optical property of the active layer is constant laterally across the active layer and a gradient state in which the optical property varies laterally across the active layer; and
control circuitry that supplies signals to the first, second, third, and fourth terminals.

18. The vehicle defined in claim 17 wherein the active layer comprises an active layer selected from the group consisting of: a liquid crystal layer with polarizers, a guest-host liquid crystal layer, a suspended particle device, and an electrochromic light modulator.

19. The vehicle defined in claim 18 wherein the active layer comprises a liquid crystal light modular layer having a thickness, wherein the first electrode layer is configured to heat the active layer when current is passed between the first and second terminals of the first electrode layer, and wherein the second electrode layer is configured to supply an electric field across the thickness that varies as a function of position between the third and fourth electrodes.

20. The vehicle defined in claim 17 wherein the first electrode layer comprises an ohmic heating layer that is configured to ohmically heat the active layer while current passes between the first and second terminals of the first electrode layer.

\* \* \* \* \*